Dec. 20, 1927.
J. E. HESS
REFUSE FURNACE
Filed April 13, 1926
1,653,282
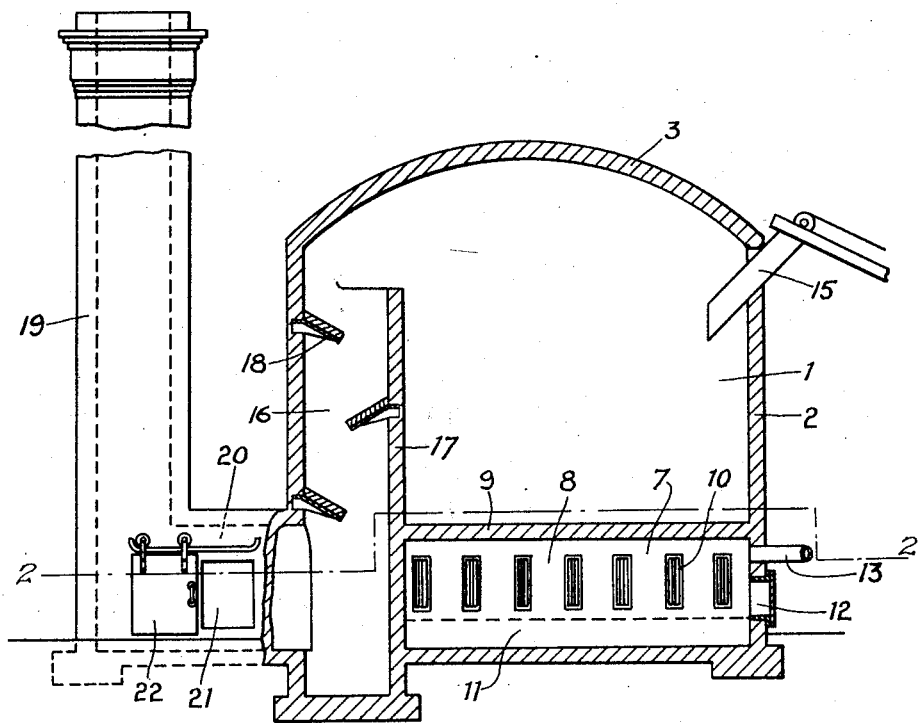
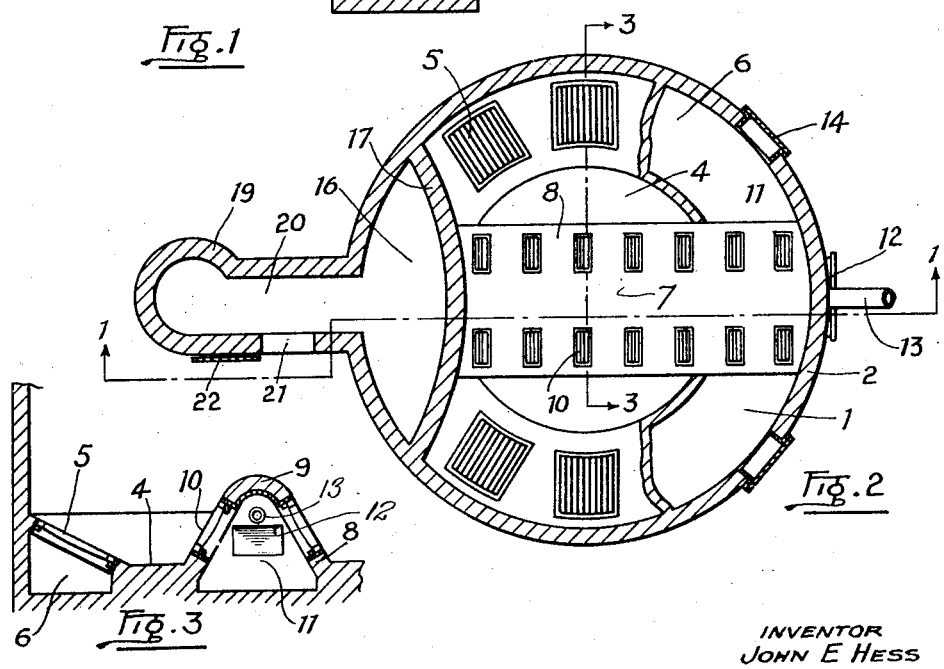
INVENTOR
JOHN E HESS
BY
ATTORNEYS Patented Dec. 20, 1927.

1,653,282

UNITED STATES PATENT OFFICE.

JOHN E. HESS, OF NEW WESTMINSTER, BRITISH COLUMBIA, CANADA.

REFUSE FURNACE.

Application filed April 13, 1926. Serial No. 101,764.

My invention relates to improvements in refuse furnaces the object of which is to provide means whereby complete combustion of the sawdust or other refuse thrown into the furnace is obtained, so that the gases emitted from the stack are free from smoke or particles of solid matter.

The invention consists essentially of a furnace and a stack and a vertical flue through which the products of combustion are passed at low velocity so as to cause complete precipitation of particles of solid matter prior to reaching the stack, and means for admitting draught to the furnace in such a manner as to ignite all combustible matter, as will be more fully described in the following specification, in which—

Fig. 1 is a sectional elevation taken on the line 1—1 of Figure 2.

Fig. 2 is a section plan view taken along the line 2—2 of Figure 1.

Fig. 3 is a partial section taken on the line 3—3 of Figure 2.

In the drawings like characters of reference indicate corresponding parts in each figure.

The numeral 1 indicates generally a furnace of any suitable type having side walls 2, a dome 3 and a floor 4 which is surrounded with grate areas 5 over ash pits 6. Extending centrally across the floor is a longitudinal grate area 7 presenting oppositely inclined walls 8 having their upper converging edges connected together as indicated at 9. These walls 8 are provided at suitable intervals with inserted grates 10 and the space 11 reserved between the walls serves as a combined ash pit and draft flue accessible through a door 12. A natural draft air supply is obtained through the door 12 but use may also be made of a forced draft apparatus such as a blower through the provision of the forced draft pipe 13. As a means of access to the ash pits 6 doors 14 are provided in the walls 2 of the burner.

The numeral 15 indicates a feed hopper through which the sawdust or other refuse is delivered to the furnace. The numeral 16 indicates a down draught flue, preferably formed within the furnace body and bounded on its inner side by a wall 17. From opposing walls of the flue baffles 18 are projected so as to cause the gases from the burner to follow a tortuous path and permit rapid precipitation of the particles of solid matter therefrom. The effective cross sectional area of the flue 16 is considerably greater than the cross sectional areas of any other passages through which the gases are adapted to travel before reaching the outside air, so that the velocity of the gas flow downwards through the flue is less than the velocity that particles of solid matter would attain in falling by gravity in still air. The numeral 19 indicates a vertical stack which is connected to the down draught flue by a horizontal flue 20 having an opening 21 in one of its walls normally closed by a sliding door 22, which door affords access to the horizontal flue and the base of the down draught flue 16, and also serves as a means for controlling the downward flow of gases therethrough, should external wind conditions tend to increase the gas flow from the furnace beyond the desired limit.

Having thus described the several parts of my invention I will now briefly explain its function.

Refuse is fed into the furnace through the feed hopper 15 and falls onto the arch 9 of the grate area 7, spreading down the sloping walls 8 and over the grate bars 10, filling the floor 4 and covering the grate areas 5, natural draught is admitted through the doors 14 to the ash pits 6 and through the grates 5 to support combustion of the fire. Further draught, either natural or forced, is admitted to the fire through the grates 10, which being acutely inclined permit the fire when settling to expose a small portion of the grates so that draught may be produced in a substantially horizontal manner across the surface of the fire, intensifying its heat and consuming the smoke. The downdraught flue wall 17 being under the influence of the heat of the fire in the furnace would produce a rising current in the flue 16 were it not for the pull of the stack 19, so that the net result of the two forces is to retard appreciably the down draught, which is further checked by the baffles 18 so that particles of solid matter may fall clear of the gas flow to the base of the down draught flue 16 below the level of the horizontal flue 20 and beyond the influence of the draught in that flue.

If external wind velocity increases beyond a desired degree, the door 22 is moved to permit a sufficient flow of air through the opening 21 to prevent an undue pull being exerted by the stack 19 on the down draught flue 16.

What I claim as my invention is:

A refuse furnace comprising a substantially cylindrical chamber having a grate and a smoke outlet adjacent the base of the chamber adapted to communicate with an updraught flue, a downdraught flue constructed within the chamber utilizing a portion of the furnace wall to form one vertical side thereof and an oppositely curved wall within the chamber forming the other vertical wall, said downdraught flue communicating between the main portion of the chamber and the outlet opening.

Dated at Vancouver, B. C., this 30th day of March, 1926.

JOHN E. HESS.